(12) United States Patent
Abe et al.

(10) Patent No.: US 8,724,294 B2
(45) Date of Patent: May 13, 2014

(54) SOLID ELECTROLYTIC CAPACITOR AND METHOD OF MANUFACTURING SOLID ELECTROLYTIC CAPACITOR

(75) Inventors: Yousuke Abe, Sanda (JP); Atsushi Furuzawa, Habikino (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 188 days.

(21) Appl. No.: 13/293,216

(22) Filed: Nov. 10, 2011

(65) Prior Publication Data
US 2012/0134074 A1  May 31, 2012

(30) Foreign Application Priority Data

Nov. 30, 2010  (JP) ................................. 2010-266525

(51) Int. Cl.
*H01G 9/00* (2006.01)
*H01G 4/06* (2006.01)
*H01G 5/013* (2006.01)

(52) U.S. Cl.
USPC ........................... 361/523; 361/524; 29/25.03

(58) Field of Classification Search
None
See application file for complete search history.

(56) References Cited

U.S. PATENT DOCUMENTS

| 5,455,736 | A | 10/1995 | Nishiyama et al. | |
|---|---|---|---|---|
| 6,483,694 | B1 * | 11/2002 | Monden et al. | 361/523 |
| 7,025,795 | B2 * | 4/2006 | Monden et al. | 29/25.03 |
| 7,046,504 | B2 * | 5/2006 | Sakai et al. | 361/523 |
| 7,232,469 | B2 * | 6/2007 | Monden et al. | 29/25.03 |
| 7,400,492 | B2 * | 7/2008 | Baba et al. | 361/528 |

FOREIGN PATENT DOCUMENTS

JP  7-122464 A  5/1995

* cited by examiner

*Primary Examiner* — Jayprakash N Gandhi
*Assistant Examiner* — Dion Ferguson
(74) *Attorney, Agent, or Firm* — Westerman, Hattori, Daniels & Adrian, LLP

(57) ABSTRACT

A solid electrolytic capacitor having an anode element, a dielectric film covering a surface of the anode element, a conductive polymer layer provided on the dielectric film, and a water-repellent portion provided on the dielectric film not in contact with the conductive polymer layer and containing silicone oil is provided.

10 Claims, 4 Drawing Sheets

US 8,724,294 B2

SOLID ELECTROLYTIC CAPACITOR AND METHOD OF MANUFACTURING SOLID ELECTROLYTIC CAPACITOR

This nonprovisional application is based on Japanese Patent Application No. 2010-266525 filed with the Japan Patent Office on Nov. 30, 2010, the entire contents of which are hereby incorporated by reference.

BACKGROUND OF THE INVENTION

1. Field of the Invention

The present invention relates to a solid electrolytic capacitor and a method of manufacturing a solid electrolytic capacitor.

2. Description of the Related Art

A solid electrolytic capacitor having a conductive polymer layer as an electrolyte has conventionally widely been known as a capacitor suitable for reduction in size. In order to achieve a further greater capacity in such a solid electrolytic capacitor, a technique to increase a surface area of an anode element by etching a surface of an anode element made of a metal foil or employing a metal sintered body as an anode element has been adopted.

For example, Japanese Patent Laying-Open No. 7-122464 discloses manufacturing of a solid electrolytic capacitor by forming a dielectric film composed of tantalum oxide on a surface of a sintered body by anodizing the surface of the sintered body of tantalum and by forming a conductive polymer layer on the dielectric film. In addition, this publication discloses completely covering the inside of fine holes formed in the surface of the sintered body with the conductive polymer layer.

As a result of the studies made by the present inventors, however, it has been found that it is difficult to completely cover the inside of the fine holes in the anode element with the conductive polymer layer and a part of the dielectric film is exposed without being covered with the conductive polymer layer. If such a solid electrolytic capacitor is placed, for example, in an environment at high humidity, external moisture permeates and diffuses in the solid electrolytic capacitor and directly comes in contact with the dielectric film, resulting in increase in capacity of the solid electrolytic capacitor. A solid electrolytic capacitor of which capacity varies depending on an environment is low in reliability.

SUMMARY OF THE INVENTION

A first aspect of the present invention is directed to a solid electrolytic capacitor which has an anode element, a dielectric film which covers a surface of the anode element, a conductive polymer layer which is provided on the dielectric film, and a water-repellent portion which is provided on the dielectric film not in contact with the conductive polymer layer and contains silicone oil.

A second aspect of the present invention is directed to a method of manufacturing a solid electrolytic capacitor, which has the steps of forming a dielectric film on a surface of an anode element, forming a conductive polymer layer on the dielectric film, forming a cathode layer on the conductive polymer layer, and forming a water-repellent portion which contains silicone oil on the dielectric film at least after the step of forming a conductive polymer layer.

The foregoing and other features, aspects and advantages of the present invention will become more apparent from the following detailed description of the present invention when taken in conjunction with the accompanying drawings.

DESCRIPTION OF THE PREFERRED EMBODIMENTS

Figure 1:
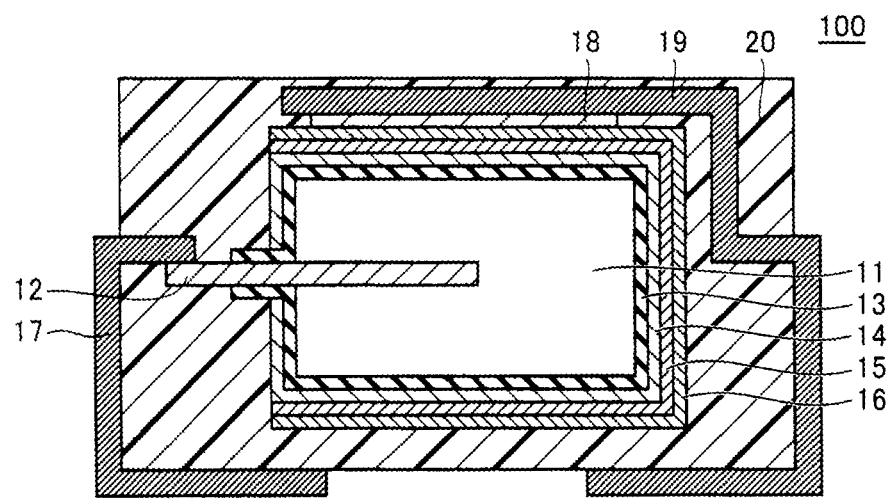
FIG. 1 is a schematic cross-sectional view of a solid electrolytic capacitor according to a first embodiment.

An embodiment of a solid electrolytic capacitor according to the present invention will be described hereinafter with reference to the drawings. The embodiment below is shown by way of example and the present invention can be carried out in various embodiments within the scope of the present invention. It is noted that, in the drawings of the present invention, the same or corresponding elements have the same reference characters allotted.

First Embodiment

Solid Electrolytic Capacitor

FIG. 1 shows a schematic cross-sectional view of a solid electrolytic capacitor according to a first embodiment. In FIG. 1, a solid electrolytic capacitor 100 includes a capacitor element having an anode element 11 on which an anode lead 12 is erected, a dielectric film 13 covering a surface of anode element 11, a conductive polymer layer 14 formed on dielectric film 13, and a carbon layer 15 and a silver paint layer 16 serving as a cathode layer that are successively provided on conductive polymer layer 14. An anode terminal 17 is connected to anode lead 12 of this capacitor element, and a cathode terminal 19 is connected to silver paint layer 16, with an adhesive layer 18 made of a conductive adhesive being interposed. An exterior resin 20 seals a capacitor element 10 such that a part of anode terminal 17 and a part of cathode terminal 19 are exposed.

Figure 2:
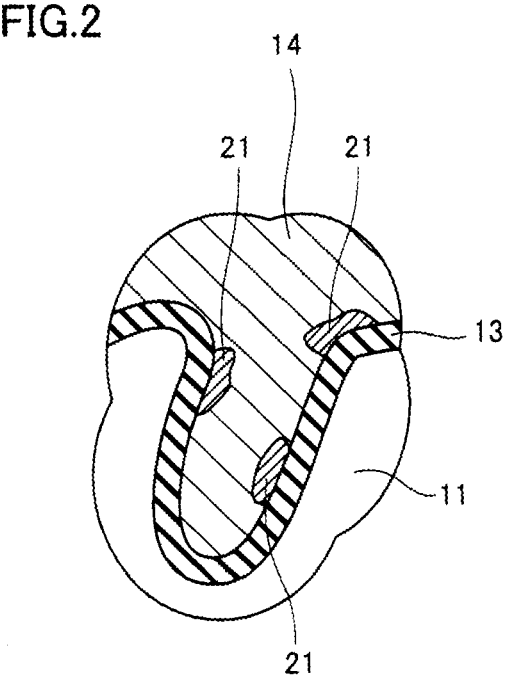
FIG. 2 is a schematic cross-sectional view showing a surface of an anode element in the solid electrolytic capacitor according to the first embodiment.

FIG. 2 shows a schematic cross-sectional view showing a surface of the anode element in the solid electrolytic capacitor according to the first embodiment. As shown in FIG. 2, anode element 11 has a recessed portion in the surface and a surface of the recessed portion is also covered with dielectric film 13. In addition, conductive polymer layer 14 is provided on dielectric film 13, a water-repellent portion 21 is provided in a portion where conductive polymer layer 14 and dielectric film 13 do not come in contact with each other, and at that portion, dielectric film 13 and water-repellent portion 21 are in contact with each other. Namely, the surface of dielectric film 13 is covered with conductive polymer layer 14 and water-repellent portion 21. Water-repellent portion 21 contains silicone oil. It is noted that details of the silicone oil will be described later.

<<Method of Manufacturing Solid Electrolytic Capacitor>>

Figure 3:
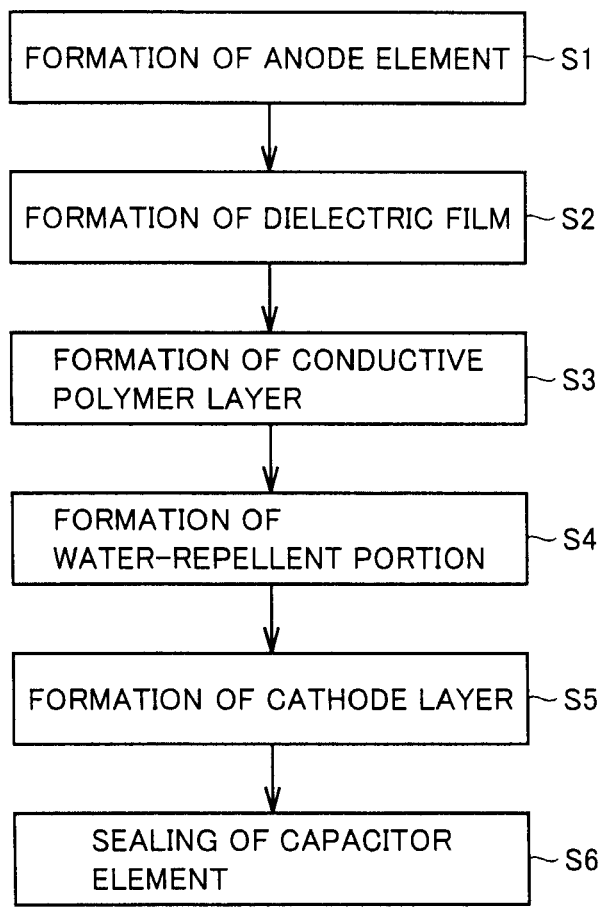
FIG. 3 is a flowchart showing one example of a method of manufacturing a solid electrolytic capacitor according to the first embodiment.
Figure 4:
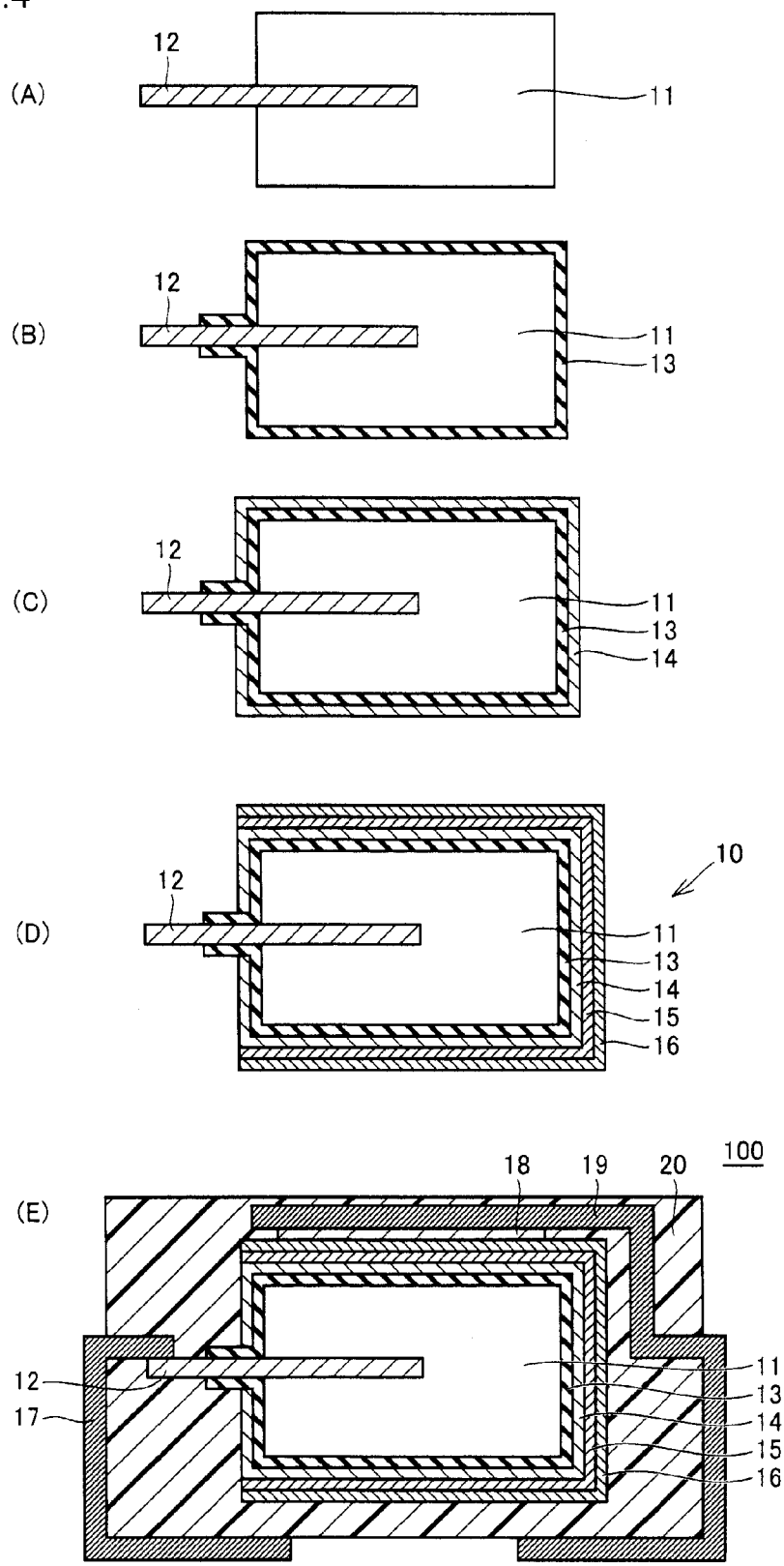
FIG. 4 is a schematic cross-sectional view illustrating one example of the method of manufacturing a solid electrolytic capacitor according to the first embodiment.

FIG. 3 is a flowchart showing one example of a method of manufacturing a solid electrolytic capacitor according to the first embodiment and FIG. 4 is a schematic cross-sectional view illustrating one example of the method of manufacturing a solid electrolytic capacitor according to the first embodiment. One example of the method of manufacturing a solid electrolytic capacitor according to the first embodiment will be described hereinafter with reference to FIGS. 2 to 4.

(Step of Forming Anode Element)

Initially, as shown in FIG. 4(A), anode element 11 is formed in step S1 in FIG. 3. For example, metal powders are prepared and the powders are molded in a desired shape while one end side in a longitudinal direction of rod-shaped anode lead 12 is buried in the metal powders. Then, by sintering these molded powders, anode element 11 having a porous structure, in which one end of anode lead 12 is buried, is formed. Therefore, anode element 11 has such a shape as having a large number of recessed portions in the surface.

Though a material for anode element 11 is not particularly limited, from a point of view of ease in forming dielectric film 13, such a valve metal as aluminum, tantalum or niobium is preferably used. In addition, though a material for anode lead 12 is not particularly limited either, from a point of view the same as that of anode element 11, a valve metal is preferably used. In a case where anode element 11 is formed of tantalum powders, dielectric film 13 higher in strength than in a case where powders of other valve metal, such as niobium or aluminum, are used can be obtained, and hence use of tantalum is preferred.

(Step of Forming Dielectric Film)

Then, as shown in FIG. 4(B), dielectric film 13 is formed on the surface of anode element 11 in step S2 in FIG. 3. A method of forming dielectric film 13 is not particularly limited. For example, in a case where anode element 11 is made of a valve metal, dielectric film 13 can be formed on the surface of anode element 11 by subjecting anode element 11 to chemical conversion treatment. As chemical conversion treatment, for example, anode element 11 may be subjected to heat treatment by being immersed in a chemical conversion solution such as an ammonium adipate solution or a voltage may be applied to anode element 11 while it is immersed in a chemical conversion solution. Through the present step, the surface of anode element 11 can be covered with dielectric film 13.

(Step of Forming Conductive Polymer Layer)

Then, as shown in FIG. 4(C), conductive polymer layer 14 is formed on dielectric film 13 in step S3 in FIG. 3. Conductive polymer layer 14 can be formed with a chemical polymerization method or an electrolytic polymerization method.

A method of forming conductive polymer layer 14 with a chemical polymerization method is not particularly restricted. For example, conductive polymer layer 14 can be formed by immersing anode element 11 having dielectric film 13 formed in a polymerization solution containing a precursor monomer of conductive polymer layer 14, an oxidizing agent and a dopant and causing oxidation polymerization of the precursor monomer on the dielectric film. Alternatively, for example, anode element 11 may be immersed in a precursor monomer and thereafter it may be immersed in a solution containing an oxidizing agent and a dopant. Alternatively, a gas containing a precursor monomer may be employed.

A method of forming conductive polymer layer 14 with an electrolytic polymerization method is not particularly restricted. For example, conductive polymer layer 14 can be formed by immersing anode element 11 in an electrolytic solution containing a precursor monomer and a dopant and causing electrolytic polymerization of the precursor monomer on dielectric film 13. Alternatively, a conductive precoating layer is preferably provided in advance on the surface of anode element 11 before the electrolytic polymerization method is performed.

A precursor monomer is a compound which becomes polypyrrole, polythiophene, polyfuran, or polyaniline through polymerization. It is noted that polypyrrole, polythiophene, polyfuran, and polyaniline herein represent polymers having polypyrrole, polythiophene, polyfuran, and polyaniline as basic skeletons, respectively. Therefore, polypyrrole, polythiophene, polyfuran, and polyaniline may also include derivatives thereof. For example, 3,4-ethylenedioxythiophene, 3-alkylthiophene, N-methylpyrrole, N,N-dimethylaniline, N-alkylaniline, and the like can be employed as the precursor monomer.

An oxidizing agent should only be capable of polymerizing a precursor monomer, and for example, sulfuric acid, hydrogen peroxide, iron (III), copper (II), chromium (VI), cerium (IV), manganese (VII), zinc (II), and the like can be employed. In particular, aromatic sulfonic acid metal salt forming salt together with such a metal has not only a function as an oxidizing agent but also a function as a dopant, and therefore it can suitably be used. For example, naphthalenesulfonic acid metal salt, tetralin sulfonic acid metal salt, alkyl benzene sulfonic acid metal salt, and alkoxybenzene sulfonic acid metal salt can be used as the aromatic sulfonic acid metal salt.

For example, an acid or a salt of a sulfonic acid compound such as alkyl sulfonic acid, aromatic sulfonic acid, and polycyclic aromatic sulfonic acid, as well as sulfuric acid, nitric acid, and the like can be exemplified as the dopant. In addition, aromatic sulfonic acid metal salt having a function as an oxidizing agent and a function as a dopant can be used as described above.

Figure 5:
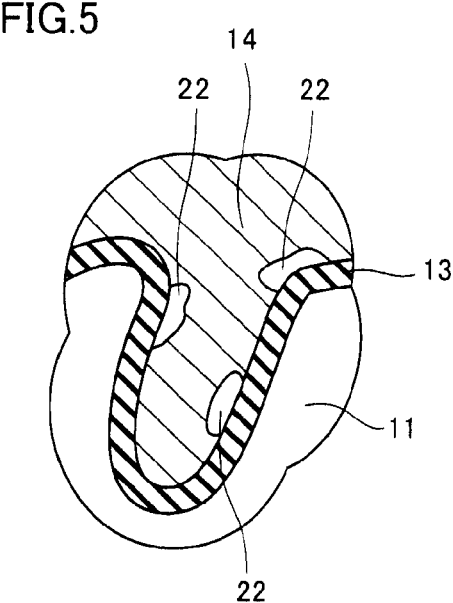
FIG. 5 is a schematic cross-sectional view showing a surface of an anode element before a water-repellent portion is formed, in the method of manufacturing a solid electrolytic capacitor according to the first embodiment.

Here, since conductive polymer layer 14 has a polymer formed as a result of polymerization of a precursor monomer as the basic skeleton, it is not uniformly formed on dielectric film 13 on the surface of anode element 11 in an irregular shape, and it is formed in such a state that a void 22 as shown in FIG. 5 is present. Therefore, in dielectric film 13, a portion not covered with conductive polymer layer 14, that is, a portion where conductive polymer layer 14 and dielectric film 13 do not come in contact with each other, is produced.

In a case where void 22 as above is present in anode element 11 of the solid electrolytic capacitor, for example, when this solid electrolytic capacitor is placed in an environment at high humidity, external moisture permeates and diffuses in the solid electrolytic capacitor, reaches void 22, and directly comes in contact with dielectric film 13. When moisture comes in direct contact with dielectric film 13, void 22 has capability to store electric power, resulting in increase in apparent electrode area and increase in capacity of the solid electrolytic capacitor. Then, in the present embodiment, the following step S4 is performed.

(Step of Forming Water-Repellent Portion)

As shown in FIG. 2, water-repellent portion 21 is formed by permeating silicone oil into void 22 in FIG. 5 in step S4 in FIG. 3. Water-repellent portion 21 can be formed, for example, by immersing anode element 11 having conductive polymer layer 14 formed in the silicone oil.

Water-repellent portion 21 can be formed by filling void 22 with the silicone oil or it can be formed also by silicone oil covering the surface of dielectric film 13 not in contact with conductive polymer layer 14. In particular, water-repellent portion 21 formed by filling void 22 with silicone oil is suitable, because permeation of external moisture can more efficiently be prevented.

The silicone oil is preferably an oligomer having a degree of polymerization not lower than 2 and not higher than 2000. Among others, linear silicone oil and cyclic silicone oil are preferred, and alkyl group such as methyl group may be bonded to a silicon (Si) atom in a molecule. As a specific cyclic silicone oil, for example, decamethylcyclopentasiloxane, dodecamethylcyclohexasiloxane, tetradecamethylcycloheptasiloxane, and the like are preferred. In addition, as a specific linear silicone oil, decamethyltetrasiloxane, dodecamethylpentasiloxane, tetradecamethylhexasiloxane, and the like are preferred.

Any silicone oil above can permeate into void 22 in conductive polymer layer 14. This may be because a molecular weight of the silicone oil above is relatively small. In addition, water-repellent portion 21 formed by permeation of the silicone oil above into void 22 can have high water repellency originating from water repellency of the silicone oil. Further, in particular, decamethylcyclopentasiloxane is more preferably used as the silicone oil. This may be because, among the silicone oils above, characteristics of decamethylcyclopentasiloxane relatively low in molecular weight, for example, such physical property values as viscosity and a melting point, are suitable for permeation into conductive polymer layer 14.

Alternatively, silicone oil may permeate into void 22 in conductive polymer layer 14 in a state of a liquid mixture in which the silicone oil and a solvent are mixed. In this case, since concentration of the silicone oil in the liquid mixture is lowered, the silicone oil is in a dispersed state without aggregating and hence the silicone oil can efficiently permeate into conductive polymer layer 14. Therefore, water-repellent portion 21 can more reliably be formed in void 22. As a solvent, for example, an ester-based solvent such as isopropyl myristate, isopropyl palmitate and propylene glycol monomethyl ether acetate and an alcohol-based solvent such as ethanol can suitably be employed. It is noted that this solvent is removed in heating treatment or the like during a process for manufacturing a solid electrolytic capacitor.

(Step of Forming Cathode Layer)

Then, as shown in FIG. 4(D), the cathode layer, for example, carbon layer 15 and silver paint layer 16, is formed in step S5 in FIG. 3.

A method of forming each of carbon layer 15 and silver paint layer 16 is not particularly limited, and it can be formed with a known technique. For example, carbon layer 15 can be formed by immersing anode element 11 having conductive polymer layer 14 formed in a solution in which carbon particles are dispersed and thereafter performing drying treatment. In addition, silver paint layer 16 can be formed after carbon layer 15 is formed, by immersing anode element 11 in a solution containing silver particles and thereafter performing drying treatment. Through the steps above, capacitor element 10 is fabricated.

(Step of Sealing Capacitor Element)

Then, as shown in FIG. 4(E), capacitor element 10 is sealed in step S6 in FIG. 3 to thereby manufacture a solid electrolytic capacitor. Though a sealing method is not particularly limited, for example, the following method is available.

Namely, initially, anode terminal 17 is connected to exposed one end of anode lead 12, adhesive layer 18 is formed on silver paint layer 16, and one end of cathode terminal 19 is connected thereto. A material for each of anode terminal 17 and cathode terminal 19 is not particularly limited, and the material should only allow conduction. For example, copper, a copper alloy and the like can be employed. In addition, a material for adhesive layer 18 is not particularly limited and it should only have conductivity and adhesiveness.

Then, capacitor element 10 is sealed with exterior resin 20 such that the other ends of anode terminal 17 and cathode terminal 19 are exposed. Though a material for exterior resin 20 is not particularly limited, an insulator is preferred and for example, epoxy resin can be employed. Finally, exposed anode terminal 17 and cathode terminal 19 are bent along exterior resin 20, followed by aging treatment, to thereby manufacture a solid electrolytic capacitor shown in FIG. 4(E).

According to the method of manufacturing a solid electrolytic capacitor in the first embodiment above, water-repellent portion 21 containing silicone oil is formed on dielectric film 13 not in contact with conductive polymer layer 14. Namely, dielectric film 13 not covered with conductive polymer layer 14 is covered with water-repellent portion 21.

Therefore, the solid electrolytic capacitor manufactured according to the first embodiment can have anode element 11, dielectric film 13 covering the surface of anode element 11, conductive polymer layer 14 provided on dielectric film 13, and water-repellent portion 21 provided on dielectric film 13 not in contact with conductive polymer layer 14 and containing silicone oil.

According to the construction above, since direct contact between dielectric film 13 and external moisture permeating into the solid electrolytic capacitor can be suppressed, increase in capacity of the solid electrolytic capacitor due to contact of moisture with dielectric film 13 can be suppressed. In particular, since no other member is present between water-repellent portion 21 and dielectric film 13 and water-repellent portion 21 and dielectric film 13 come in direct contact with each other, contact between dielectric film 13 and moisture can more effectively be suppressed.

In a case where a sintered body is employed for anode element 11, a size of a pore in anode element 11 which is a porous body is small and the shape thereof is complicated and intricate. As thus anode element 11 made of a sintered body has a complicated recessed portion in the surface, uniform formation of conductive polymer layer 14 on dielectric film 13 covering anode element 11 tends to be more difficult. Further, since the recessed portion is fine, it is also further difficult to permeate a highly viscous substance or a substance having high molecular weight into the recessed portion.

In contrast, according to the first embodiment, silicone oil which is an oligomer having a degree of polymerization not lower than 2 and not higher than 2000 is employed. Therefore, the silicone oil can permeate into the fine recessed portion. Thus, even in a case where anode element 11 is made of a sintered body, water-repellent portion 21 can be formed on dielectric film 13 not in contact with conductive polymer layer 14 and hence increase in capacity of the solid electrolytic capacitor due to contact of moisture with dielectric film 13 can be suppressed. Therefore, variation in capacity of the solid electrolytic capacitor can be suppressed and hence a highly reliable solid electrolytic capacitor can be manufactured.

Second Embodiment

Method of Manufacturing Solid Electrolytic Capacitor

Figure 6:
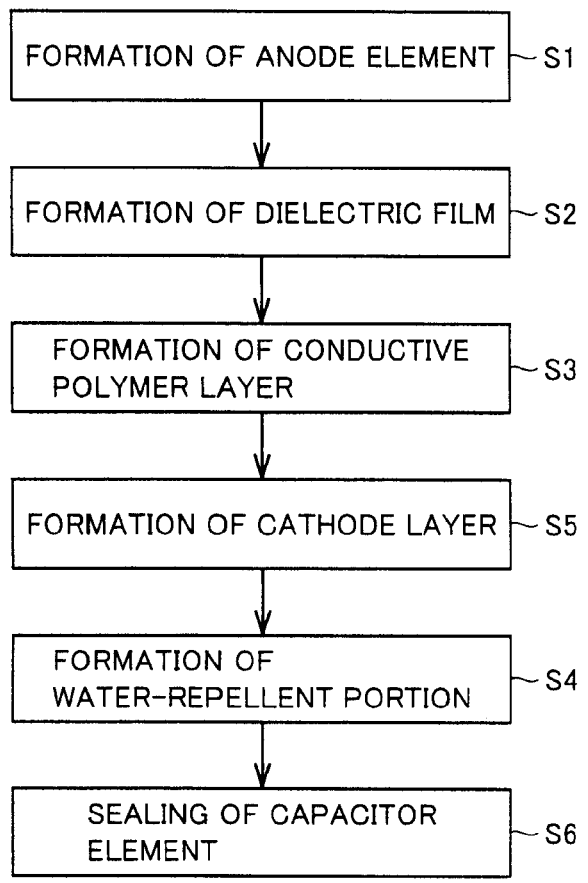
FIG. 6 is a flowchart showing one example of a method of manufacturing a solid electrolytic capacitor according to a second embodiment.

FIG. 6 is a flowchart showing one example of a method of manufacturing a solid electrolytic capacitor according to a second embodiment, representing another example of the manufacturing method of the present invention. One example of the method of manufacturing a solid electrolytic capacitor according to the second embodiment will be described hereinafter with reference to FIGS. 2, 4 and 6.

(Step of Forming Anode Element)

Initially, as shown in FIG. 4(A), anode element 11 is formed in step S1 in FIG. 6. Since the present step is the same as step S1 in the first embodiment, description thereof will not be repeated.

(Step of Forming Dielectric Film)

Then, as shown in FIG. 4(B), dielectric film 13 is formed on the surface of anode element 11 in step S2 in FIG. 6. Since the present step is the same as step S2 in the first embodiment, description thereof will not be repeated.

(Step of Forming Conductive Polymer Layer)

Then, as shown in FIG. 4(C), conductive polymer layer 14 is formed on the surface of dielectric film 13 in step S3 in FIG. 6. Since the present step is the same as step S3 in the first embodiment, description thereof will not be repeated.

(Step of Forming Cathode Layer)

Then, as shown in FIG. 4(D), the cathode layer, for example, carbon layer 15 and silver paint layer 16, is formed in step S5 in FIG. 6. Since the present step is the same as step S5 in the first embodiment, description thereof will not be repeated.

(Step of Forming Water-Repellent Portion)

Then, as shown in FIG. 2, water-repellent portion 21 is formed in step S4 in FIG. 6. Water-repellent portion 21 can be formed, for example, by immersing anode element 11 having conductive polymer layer 14 formed in silicone oil.

As described above, in dielectric film 13, a portion not covered with conductive polymer layer 14, that is, a portion where conductive polymer layer 14 and dielectric film 13 do not come in contact with each other, is produced. Then, after carbon layer 15 and silver paint layer 16 are formed, anode element 11 is immersed in the silicone oil above so that water-repellent portion 21 containing the silicone oil is formed on the surface of dielectric film 13 not in contact with conductive polymer layer 14.

Water-repellent portion 21 may be constructed such that void 22 is filled with the silicone oil as described above or such that the silicone oil covers the surface of dielectric film 13 not in contact with conductive polymer layer 14. In particular, void 22 filled with the silicone oil is suitable, because permeation of external moisture can more efficiently be prevented.

(Step of Sealing Capacitor Element)

Then, as shown in FIG. 4(E), capacitor element 10 is sealed in step S6 in FIG. 6 to thereby manufacture a solid electrolytic capacitor. Since the present step is the same as step S6 in the first embodiment, description thereof will not be repeated.

According to the method of manufacturing a solid electrolytic capacitor in the second embodiment above, water-repellent portion 21 containing silicone oil is formed on dielectric film 13 not in contact with conductive polymer layer 14. Namely, dielectric film 13 not covered with conductive polymer layer 14 is covered with water-repellent portion 21.

Therefore, the solid electrolytic capacitor manufactured according to the second embodiment can have anode element 11, dielectric film 13 covering the surface of anode element 11, conductive polymer layer 14 provided on dielectric film 13, and water-repellent portion 21 provided on dielectric film 13 not in contact with conductive polymer layer 14 and containing silicone oil.

According to the construction above, since direct contact between dielectric film 13 and external moisture permeating into the solid electrolytic capacitor can be suppressed, increase in capacity of the solid electrolytic capacitor due to contact of moisture with dielectric film 13 can be suppressed. In particular, since no other member is present between water-repellent portion 21 and dielectric film 13 and water-repellent portion 21 and dielectric film 13 come in direct contact with each other, contact between dielectric film 13 and moisture can more effectively be suppressed.

In a case where a sintered body is employed for anode element 11, a size of a pore in anode element 11 which is a porous body is small and the shape thereof is complicated and intricate. As thus anode element 11 made of a sintered body has a complicated recessed portion in the surface, uniform formation of conductive polymer layer 14 on dielectric film 13 covering anode element 11 tends to be more difficult. Further, since the recessed portion is fine, it is also difficult to permeate a highly viscous substance or a substance having high molecular weight into the recessed portion.

In contrast, according to the second embodiment, silicone oil which is an oligomer having a degree of polymerization not lower than 2 and not higher than 2000 is employed. Therefore, the silicone oil can permeate into the fine recessed portion. Thus, even in a case where anode element 11 is made of a sintered body, water-repellent portion 21 can be formed on dielectric film 13 not in contact with conductive polymer layer 14 and hence increase in capacity of the solid electrolytic capacitor due to contact of moisture with dielectric film 13 can be suppressed. Therefore, variation in capacity of the solid electrolytic capacitor can be suppressed and hence a highly reliable solid electrolytic capacitor can be manufactured.

Since the present second embodiment is otherwise the same as the first embodiment, description thereof will not be repeated.

In the present second embodiment, though water-repellent portion 21 is formed after carbon layer 15 and silver paint layer 16 are formed, water-repellent portion 21 may naturally be formed after carbon layer 15 is formed.

The present invention is not limited to the solid electrolytic capacitor in FIG. 1. For example, in a wound-type solid electrolytic capacitor, an anode element is made of a metal foil and its specific surface area is increased. In a stack-type solid electrolytic capacitor, an anode element is made of a metal plate and its specific surface area is increased. Therefore, in these solid electrolytic capacitors as well, it is difficult to form a conductive polymer layer on a dielectric film on the surface of the anode element such that the conductive polymer layer uniformly comes in contact with the dielectric film. Thus, by providing a water-repellent portion on the dielectric film not in contact with the conductive polymer layer in the wound-type solid electrolytic capacitor and the stack-type solid electrolytic capacitor, increase in capacity of the solid electrolytic capacitor due to contact of moisture with the dielectric film can be suppressed.

EXAMPLES

The present invention will be described hereinafter in further detail with reference to Examples, however, the present invention is not limited thereto.

Example 1

In present Example 1, a solid electrolytic capacitor having a structure shown in FIG. 1 was fabricated. A specific method of manufacturing a solid electrolytic capacitor will be described hereinafter.

Initially, tantalum powders were prepared and the tantalum powders were molded in a parallelepiped shape while one end side in a longitudinal direction of a rod-shaped anode lead made of tantalum was buried in the metal powders. Then, by sintering the molded powders, the anode element having a porous structure, in which one end of the anode lead had been buried, was formed.

Then, the anode element was subjected to chemical conversion treatment by immersing the anode element in a chemical conversion solution and applying a voltage to the anode lead. Thus, the dielectric film composed of $Ta_2O_5$ was formed on the surface of the anode element.

Then, a conductive polymer layer was formed on the dielectric film with the electrolytic polymerization method. Specifically, initially, a conductive pre-coating layer was formed by immersing the anode element in a solution containing an oxidizing agent, followed by drawing up and drying, and thereafter bringing the anode element in contact with pyrrole which is a precursor monomer of the conductive polymer layer.

Then, the conductive polymer layer was formed on the dielectric film by immersing the anode element having the pre-coating layer formed in an electrolytic solution containing pyrrole and a dopant and causing electrolytic polymerization of the precursor monomer.

Then, the anode element having the conductive polymer layer was immersed in a solution mixture of decamethylcyclopentasiloxane and propylene glycol monomethyl ether acetate. The anode element was drawn up and placed in an electric furnace for heating at 100° C. so that the solvent was removed. A water-repellent portion was thus formed. It is noted that an amount of mixing decamethylcyclopentasiloxane in the solution mixture was set to 5 volume % with respect to an amount of the solution of propylene glycol monomethyl ether acetate.

Then, a carbon layer was formed by immersing the anode element in a solution in which carbon particles had been dispersed, followed by drying treatment. Then, a silver paint layer was formed by immersing the anode element in a solution containing silver particles, followed by drying treatment. Through the treatment above, a capacitor element was manufactured.

Then, an anode terminal composed of copper was connected to exposed one end of the anode lead, an adhesive layer was formed on the silver paint layer, and one end of a cathode terminal composed of copper was connected thereto. Then, the capacitor element was sealed with an exterior resin composed of epoxy resin such that the other ends of the anode terminal and the cathode terminal were exposed. Then, the exposed anode terminal and cathode terminal were bent along the exterior resin, to thereby manufacture the capacitor element having the structure shown in FIG. 1. A shape of the manufactured solid electrolytic capacitor was 7.3 mm long× 4.3 mm wide×1.8 mm high.

Example 2

The solid electrolytic capacitor was manufactured with the method the same as in Example 1 except for using a solution mixture of decamethyltetrasiloxane and propylene glycol monomethyl ether acetate in the step of forming a water-repellent portion. The manufactured solid electrolytic capacitor was identical in shape to the solid electrolytic capacitor in Example 1. It is noted that an amount of mixing decamethyltetrasiloxane in the solution mixture was set to 5 volume % with respect to an amount of the solution of propylene glycol monomethyl ether acetate.

Comparative Example 1

The solid electrolytic capacitor was manufactured with the method the same as in Example 1 except that the step of forming a water-repellent portion was not performed. The manufactured solid electrolytic capacitor was identical in shape to the solid electrolytic capacitor in Example 1.

Comparative Example 2

The solid electrolytic capacitor was manufactured with the method the same as in Example 1 except that the steps of immersing the anode element in a solution mixture of polysiloxane having a degree of polymerization around 5000 and propylene glycol monomethyl ether acetate, drawing up the anode element, and placing the anode element in an electric furnace for heating at 100° C. were performed instead of the step of forming a water-repellent portion. The manufactured solid electrolytic capacitor was identical in shape to the solid electrolytic capacitor in Example 1. It is noted that an amount of mixing polysiloxane in the solution mixture was set to 5 volume % with respect to an amount of the solution of propylene glycol monomethyl ether acetate.

<Performance Evaluation>

(1) Initial Capacity of Solid Electrolytic Capacitor

A capacity ($\mu$F) of the solid electrolytic capacitor in each of Examples 1 and 2 as well as Comparative Examples 1 and 2 was measured. Specifically, an LCR meter for 4-terminal measurement was employed to measure a capacity ($\mu$F) each solid electrolytic capacitor at a frequency of 120 Hz.

(2) Capacity of Solid Electrolytic Capacitor after Reliability Test

After measurement of the capacity above, the solid electrolytic capacitors in Examples 1 and 2 as well as Comparative Examples 1 and 2 were subjected to a reliability test. Namely, each solid electrolytic capacitor was left for 50 hours in an environment in which a temperature was set to 60° C. and humidity was set to 90%, such that it was forced to take up moisture.

Then, a capacity ($\mu$F) of the solid electrolytic capacitor in each Example and each Comparative Example after the reliability test was measured at a frequency of 120 Hz, with the use of an LCR meter for 4-terminal measurement. Table 1 shows the results.

TABLE 1

|  | Initial Capacity ($\mu$F) | Capacity After Reliability Test ($\mu$F) | Rate of Change in Capacity (%) |
|---|---|---|---|
| Example 1 | 211.5 | 212.6 | 100.5 |
| Example 2 | 206.5 | 208.4 | 100.9 |
| Comparative Example 1 | 209.1 | 245.3 | 117.3 |
| Comparative Example 2 | 205.8 | 230.6 | 112.1 |

In Table 1, "initial capacity ($\mu$F)" represents a capacity of each solid electrolytic capacitor immediately after manufacturing. "Capacity after reliability test ($\mu$F)" represents a capacity of each solid electrolytic capacitor after the reliability test above. "Rate of change in capacity (%)" is a value obtained by multiplying by 100, a value calculated by dividing capacity after reliability test (μF) by initial capacity (μF), in each solid electrolytic capacitor.

Referring to Table 1, it was found that the solid electrolytic capacitors in Examples 1 and 2 are less in fluctuation in capacity before and after the reliability test than the solid electrolytic capacitor in Comparative Example 1. Therefore, it was found that reliability of the solid electrolytic capacitor improves by permeating silicone oil into an anode element having a conductive polymer layer formed.

In addition, it was found that that the solid electrolytic capacitors in Examples 1 and 2 are less in fluctuation in capacity before and after the reliability test than the solid electrolytic capacitor in Comparative Example 2. This may be because polysiloxane has a large molecular weight and hence it cannot enter a fine void as described above.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electrolytic capacitor, comprising:
   an anode element;
   a dielectric film which covers a surface of said anode element;
   a conductive polymer layer which is provided on said dielectric film; and
   a water-repellent portion which is provided between said dielectric film and said conductive polymer layer, and contains silicone oil, wherein
   a surface of said dielectric film is formed such that a contact region comes in contact with said conductive polymer layer and a non-contact region does not come in contact with said conductive polymer layer,
   said non-contact region is surrounded by said contact region, and
   said water-repellent portion is located on said non-contact region.

2. The electrolytic capacitor according to claim 1, wherein said silicone oil is an oligomer having a degree of polymerization not lower than 2 and not higher than 2000.

3. The electrolytic capacitor according to claim 1, wherein said silicone oil is composed of at least one selected from the group consisting of decamethylcyclopentasiloxane, dodecamethylcyclohexasiloxane, tetradecamethylcycloheptasiloxane, decamethyltetrasiloxane, dodecamethylpentasiloxane, and tetradecamethylhexasiloxane.

4. The electrolytic capacitor according to claim 1, wherein said anode element has a recessed portion in the surface and said water-repellent portion is provided on said dielectric film covering said recessed portion.

5. The electrolytic capacitor according to claim 1, wherein said anode element is made of a metal sintered body.

6. A method of manufacturing an electrolytic capacitor, comprising the steps of:
   forming a dielectric film on a surface of an anode element;
   forming a conductive polymer layer on said dielectric film; and
   permeating silicone oil into a region which is on a surface of said dielectric film and does not come in contact with said conductive polymer layer after said step of forming a conductive polymer layer.

7. The method of manufacturing the electrolytic capacitor according to claim 6, wherein
   said silicone oil is an oligomer having a degree of polymerization not lower than 2 and not higher than 2000.

8. The method of manufacturing the electrolytic capacitor according to claim 6, wherein
   said silicone oil is composed of at least one selected from the group consisting of decamethylcyclopentasiloxane, dodecamethylcyclohexasiloxane, tetradecamethylcycloheptasiloxane, decamethyltetrasiloxane, dodecamethylpentasiloxane, and tetradecamethylhexasiloxane.

9. The method of manufacturing the electrolytic capacitor according to claim 6, wherein
   said step of permeating silicone oil includes the step of permeating said silicone oil into said anode element having said dielectric film formed.

10. The method of manufacturing the electrolytic capacitor according to claim 6, having a step of forming a cathode layer on said conductive polymer layer before said step of permeating silicone oil.

* * * * *